United States Patent Office 3,388,181
Patented June 11, 1968

3,388,181
PREPARATION OF ISOPROPENYL ACETYLENE
Harry D. Anspon, Kansas City, Mo., assignor to General Aniline & Film Corporation, New York, N.Y., a corporation of Delaware
No Drawing. Filed Nov. 9, 1965, Ser. No. 507,036
8 Claims. (Cl. 260—678)

ABSTRACT OF THE DISCLOSURE

A process for preparing isopropenyl acetylene which comprises passing methyl butynol through a reaction zone containing a catalyst comprising phosphoric acid distributed on a solid, inert, non-porous carrier. The catalyst remains active for a plurality of successive passes of methyl butynol through the reaction zone and a black resinous polymeric coating produced on the carrier by the contact of methyl butynol with phosphoric acid appears to further catalyze the reaction of methyl butynol to isopropenyl acetylene.

The present invention relates to a process for preparing isopropenyl acetylene, and more specifically to a method for preparing isopropenyl acetylene from methyl butynol, 2-methyl-3-butyne-2-ol.

Isopropenyl acetylene has been prepared from methyl butynol wherein a catalyst is employed consisting of a porous carrier containing an aluminum salt on the surface thereof. Such catalysts are prepared by depositing an acid upon the aluminum carrier surface whereby an aluminum salt is formed in situ, or by depositing a previously formed aluminum salt upon the porous carrier material. Preparations of isopropenyl acetylene from methyl butynol using catalysts of this type have not proven to be completely satisfactory, since the formation of relatively large amounts of carbon on the catalyst material, attendant the use of such catalysts, effects a relatively rapid degradation of the catalyst and may even undesirably block the catalyst bed to the flow of the methyl buytnol reactant stream. Consequently, techniques employing such aluminum salt catalysts require frequent regeneration procedures to be carried out in order that the requisite conversion to isopropenyl acetylene may be achieved. Moreover, the porous nature of such aluminum salt catalysts allows the absorption of amounts of acid, or acid salt active ingredient, which are greater than that required to display the requisite catalytic activity. Thus, the catalyst expenditures in techniques utilizing such prior art catalysts undesirably are appreciably greater than costs corresponding to catalyst having equal or higher conversion level activity. The porosity of such catalysts also shortens the useful life thereof and aggravates regeneration problems in that some of the carbon by-product formed in the conversion reaction builds up in the interstices of the porous bodies.

Accordingly, it is the primary object of the present invention to provide a method of preparing isopropenyl acetylene from methyl butynol by the use of a catalyst which advantageously obviates the problems attendant the utilization of catalysts in similar preparations heretofore available.

It is another object of the present invention to provide a method for preparing isopropenyl acetylene from methyl butynol wherein a catalyst is employed which economically effects high yields of isopropenyl acetylene.

It is a further object of the present invention to provide a method for converting methyl butynol to isopropenyl acetylene, wherein the amount of catalyst actually employed is comparable to that displaying requisite conversion level activity.

Another object of the present invention is to provide a method for preparing isopropenyl acetylene from methyl butynol wherein a catalyst is employed which is characterized by a relatively long useful life and is excellently adapted for regeneration.

It is yet a further object of the present invention to provide a method for converting methyl butynol to isopropenyl acetylene wherein a catalyst is employed which displays the desired levels of activity over relatively long periods of time without having to be regenerated.

Broadly described, the present invention provides a method for preparing isopropenyl acetylene which comprises contacting methyl butynol with a catalyst comprising phosphoric acid distributed on a solid, inert, non-porous carrier.

By means of the method of the present invention, the conversion of methyl butynol to isopropenyl acetylene easily and economically can be carried out with relatively high yields of isopropenyl acetylene being obtained. As compared with similar techniques for preparing isopropenyl acetylene, the amount of, and consequently the expenditure for, the catalyst employed is relatively low, without a sacrifice being made to conversion or yield levels. The non-porous nature of the carrier used in the present catalyst allows all of the active phosphoric acid ingredient distributed on the carrier surface to contribute to the activity of the catalyst.

Moreover, the catalyst employed in the method of the present invention may be utilized for longer durations without clogging or without the need for regeneration, as compared with catalysts previously employed in isopropenyl acetylene preparations. Any carbon and resinous by-products forming in the conversion reaction build up on the non-porous surface of the catalyst and therefore easily may be removed when desired by a regeneration technique. In further contradistinction to catalysts employed in previous isopropenyl acetylene preparations, the formation of a resinous by-product upon the surface of the present catalyst materials surprisingly appears to contribute to the activity of the catalyst.

The invention contemplates the utilization of any solid, inert, non-porous material as the carrier for the phosphoric acid ingredient. Specific examples of suitable carrier materials include, without limitation, glass, quartz, sand, and stainless steel. Although the surface of the carrier material may be continuous, such as being the walls of a reaction zone in which the desired conversion is carried out, advantageously the carrier material is in the form of separate bodies which provide a larger total surface area. When such separate bodies of the carrier material are employed, these bodies suitably may be in any convenient shape, such as is characteristic of rough particles, grains, beads, balls, and the like. More sophisticated shapes of the carrier material are also contemplated, including those characteristic of rings, saddles, helices, fabrics, screens and the like. Such separate bodies of the carrier material suitably may be in the form of a single packed bed, a plurality of separately supported packed beds, or, in instances wherein the characteristics of the carrier material permit, in the form of a fluidized bed. In a preferred embodiment of the method of the invention the catalyst comprises a single bed of glass helices having phosphoric acid distributed on the surfaces thereof.

The phosphoric acid employed in the method of the present invention, preferably is in the ortho form, although pyrophosphoric acid and polyphosphoric acids also are suitable for utilization. The phosphoric acid component of the catalyst employed in the present invention usually is in the form of an aqueous solution having an acid concentration above about 50% by weight, and preferably in the range of from about 70 to about 90% by weight.

The amount of phosphoric acid employed distributed as the coating on the inert surface is not critical but as much surface should be coated as possible to insure maximum contact of the reactants with the active catalyst material. The actual amount of such catalyst to be employed depends on the nature of the surface to be covered, its shape, the adhesion attained, the fluidity of the solution, concentration, and also the nature of the solvent employed. In some instances, it may be desirable to dilute the phosphoric acid ingredient with a material such as dialkylphthalate ester, e.g., dimethylphthalate. When such material is employed the amount of phosphoric acid employed usually is in the range of from about 2% to about 50% preferably, from about 2% to about 20% by weight in the phthalate.

Additional materials which may be employed as a diluent are other alkyl esters of phthalic acid as well as of adipic acid, succinic acid, sebacic acid, and various monocarboxylic acids. The ester moiety apparently functions as a solvent or "carrier" for the phosphoric acid catalyst material. It additionally appears as though these materials dilute the catalyst surface so as to reduce untoward reactions which might occur on a "undiluted" surface. The use of these diluent materials may also give rise to a different catalyst specie arising from the bonding between the ester group of the diluent and acid function of the phosphoric acid.

In accordance with the method of the present invention, a reaction zone is provided with the phosphoric acid-coated carrier material in the form of the walls of the reaction zone or in the form of a single bed or a plurality of beds of separate bodies of the carrier material. The phosphoric acid ingredient suitably may be distributed over the surface of the carrier material preliminary, simultaneous, or subsequent to the introduction of the carrier material into the reaction zone. This distribution suitably may be carried out by any expedient means, including the use of spraying, immersion, or a like technique.

A stream of methyl butynol is then passed through the reaction zone maintained at a temperature usually in the range of from about 180° to about 320° C., preferably in the range of from about 210° to about 290° C., contacted with the catalytic material in the reaction zone and converted thereby to isopropenyl acetylene and water. Small amounts of free carbon and a resinous material also are produced as by-products.

Although somewhat higher and lower pressures suitably may be employed in the method of the present invention, preferably ambient pressure of about 1 atmosphere are utilized in the reaction zone. Due to the relatively high degree of unsaturation of methyl butynol and isopropenyl acetylene, the reaction usually is carried out in an oxygen-free environment. Thus, preliminary to the passage of the methyl butynol into the reaction zone, the reaction zone generally is purged with an inert gas such as nitrogen and the like.

In accordance with the method of the present invention, up to about 50% of the methyl butynol charge in the initial pass through the conversion zone may be converted to isopropenyl acetylene at over 80% recovery levels of charged methyl butynol (a) in the form of methyl butynol converted to isopropenyl acetylene and (b) unconverted methyl butynol. Based on the amount of methyl butynol converted to isopropenyl acetylene, yields of isopropenyl acetylene ranging up to about 75% on the initial pass through the reaction zone are obtained. Any unconverted methyl butynol recovered from the reaction zone may then be recycled therethrough without a preliminary regeneration of the catalyst, to provide further conversions to isopropenyl acetylene. With each pass the phosphoric acid distributed on the carrier surface is further diluted or coated with carbon and the resinous by-products. Upon repeated passes of methyl butynol through the reactor, the conversion of the methyl butynol charge per pass to isopropenyl acetylene increases up to a level of about 70% with yields of isopropenyl acetylene ranging over 90% (based on the amount of methyl butynol converted) without the catalyst having to be regenerated.

The exact theory as to why the activity of the catalyst increases upon repeated contacts with methyl butynol is unknown. However, it appears that the black resinous by-product formed in the conversion reaction promotes the activity of the diluted phosphoric acid ingredient, and when present as a coating over the phosphoric acid even functions itself as a catalyst for the conversion reaction.

The catalyst of the present invention may be reused without regeneration until the amount of the carbon by-products formed on the surface thereof in the conversion reaction lowers the activity below desired levels or the build-up of carbon and resin by-products on the catalyst presents an undesirably large resistance to flow. The contaminated catalyst then may be regenerated for reuse. In accordance with the method of the present invention, the contaminated catalyst easily may be regenerated when desired by any suitable technique, including burning off the contaminant, removing the contaminant by immersing the catalyst in a suitable solvent such as concentrated sulfuric acid, methanol and the like, or a combination of such techniques. A preferred regeneration procedure involves heating the catalyst to temperature of at least about 550° C. in an oxygen-containing atmosphere for a time period of at least about 15 minutes.

The invention having been described, the following examples are given to show specific embodiments thereof. It will be understood that the examples are given for illustration purposes and not by way of limitation.

Example I

The inside walls of a clean glass spiral tube having a tube jacket were coated at about 25° C. with 85% orthophosphoric acid. The treated spiral tube was then heated by means of the tube jacket to about 284° C., and about one mol of methyl butynol vapor was passed through the tube reactor. A conversion of methyl butynol to isopropenyl acetylene of about 0.43 mol was obtained, with the yield of isopropenyl acetylene being about 75%. Unreacted methyl butynol was recovered from the reactor in the amount of about 0.4 mol, thereby providing a total charge recovery of reacted and unreacted methyl butynol of about 84%. A coating of a black, resinous material was observed to be formed on the inside walls of the reactor.

Example II

In order to demonstrate the efficiency of the catalyst employed in the present invention when subjected to reutilization in the present process, about one mol of methyl butynol was passed through the resinous material-coated reactor obtained from the run described in Example I, with the temperature of the reactor being maintained at about 284° C. In the second pass through the reactor, the conversion of the methyl butynol to isopropenyl acetylene was about 0.6 mol, with the yield of isopropenyl acetylene being about 87%. Unreacted methyl butynol was recovered in an amount of about 0.3 mol.

It will be seen from the results on the second pass of methyl butynol through the reactor that the efficiency of the catalyst employed in the method of the present invention does not decrease with reutilization, but, to the contrary, demonstrates increased activity without having to be regenerated.

Example III

The combined procedures of Examples I and II were repeated, with the exception that during both the initial and second passes of methyl butynol vapor through the reactor, the reactor was maintained at about 211° C. A black polymeric material was observed to form on the reactor walls during the runs. The results of these tests are set forth below in Table 1.

TABLE 1

| Pass | Conversion to IPA (Percent) | Yield of IPA (Percent) | Recovery of MB (Percent) | Charge Recovery (Percent) |
|---|---|---|---|---|
| 1 | 39 | 68 | 43 | 82 |
| 2 | 58 | 82 | 29 | 87 |

The results shown in Table 1 further demonstrate that the catalyst employed in the method of the present invention exhibits increased activity in the conversion of methyl butynol to isopropenyl acetylene upon repeated usage.

Example IV

A tube-jacketed glass tube reactor was packed with ¼ inch I.D. single-turn glass helices and the packing material was wet at room temperature with 85% orthophosphoric acid and allowed to drain. Nine consecutive charges of methyl butynol vapor were passed through the tube reactor maintained at 284° C. without the packing material being regenerated. A black polymeric coating was obtained on the glass helices which bound them together. Even after nine passes of methyl butynol vapor through the reactor, the build-up of polymeric material in the catalyst bed did not present an appreciable resistance to the flow of vapor. The results of the consecutive passes through the reactor are shown below in Table 2.

TABLE 2

| Pass No. | Moles MB | Conversion to IPA (Percent) | Yield of IPA (Percent) | Recovery of MB (Percent) | Charge Recovery (Percent) |
|---|---|---|---|---|---|
| 1 | 1 | 15 | 59 | 75 | 95 |
| 2 | 1 | 35 | 72 | 51 | 86 |
| 3 | 1 | 36 | 73 | 51 | 86 |
| 4 | 1 | 39 | 71 | 44 | 84 |
| 5 | 1 | 58 | 84 | 31 | 89 |
| 6 | 1 | 57 | 78 | 27 | 84 |
| 7 | 1 | 67 | 91 | 26 | 93 |
| 8 | 1 | 63 | 82 | 25 | 88 |
|   | 1 | 68 | 89 | 24 | 92 |

Each pair of passes 2 and 3, 4 and 5, 6 and 7, and 8 and 9 was made on consecutive days without the equipment auxiliary to the reactor being cleaned for the second pass of each day in order to minimize losses due to the wetting of equipment walls. With the exception of the reactor, the apparatus employed was completely cleaned for the initial pass each day.

From the results shown in Table 2, it will be seen that the catalyst employed in the method of the present invention displays activity which is undiminished even at the end of nine passes of methyl butynol through the reactor.

To regenerate the catalyst bed, the reactor was heated to about 570° C. and maintained at this temperature for about 20 minutes, whereby a sufficient amount of the black polymeric material was burned off from the helices that the bound mass of packing material could be disintegrated with mechanical pressure. After heating the helices were covered with a thin layer of a white solid material and were ready to be coated with additional phosphoric acid for reutilization.

Example V

The inside walls of a glass spiral tube reactor were coated at room temperature with a solution containing 11.5 grams of 85% orthophosphoric acid diluted to 100 ml. with dimethyl phthalate. Three consecutive passes of one mol of methyl butynol were then passed through the reactor tube maintained at a temperature of about 211° C. On the third pass of methyl butynol through the reactor, 10 ml. of the phosphoric acid-dimethyl phthalate solution were added to the reactor simultaneously with the methyl butynol charge. The results of these runs are set forth below in Table 3.

TABLE 3

| Pass | Moles MB | Conversion to IPA (Percent) | Yield of IPA (Percent) | Recovery of MP (Percent) | Charge Recovery (Percent) |
|---|---|---|---|---|---|
| 1 | 1 | 38 | 76 | 50 | 88 |
| 2 | 1 | 37 | 81 | 55 | 91 |
| 3 | 1 | 60 | 92 | 34 | 95 |

The data set forth in Table 3 show the excellent activity of the catalyst employed in the method of the invention and further demonstarate that the dilution of the phosphoric acid catalyst with dimethyl phthalate has a beneficial effect on isopropenyl acetylene conversion in both the vapor and liquid phases.

Although further embodiments of the invention will be apparent to one skilled in the art from the description and examples given hereinabove. it will be understood that the present invention is intended to be limited only by the scope of the appended claims.

What is hereby claimed and desired to be secured by Letters Patent is:

1. A method for preparing isopropenyl acetylene which comprises contacting methyl butynol with a catalyst comprising phosphoric acid diluted with dimethyl phthalate distributed as a coating on a solid, non-porous carrier.

2. The method of claim 1 wherein said methyl butynol is contacting with said catalyst at a temperature in the range of from 180° C. to about 320° C.

3. A method for preparing isopropenyl acetylene which comprises passing methyl butynol through a reaction zone maintained at a temperature in the range of from 180° C. to about 320° C. and containing a catalyst comprising orthophosphoric acid diluted with dimethyl phthalate distributed as a coating on a glass carrier.

4. The method of claim 3 wherein said carrier is a wall of a reactor defining said reaction zone.

5. The method of claim 3 wherein said carrier is in the form of a plurality of separate bodies.

6. A method of preparing isopropenyl acetylene which comprises passing methyl butynol through a reaction zone maintained at a temperature in the range of from 180° C. to about 320° C. and containing a catalyst comprising orthophosphoric acid diluted with a material selected from alkyl esters of monocarboxylic and dicarboxylic acids distributed as a coating on a solid, inert, non-porous carrier.

7. The method of claim 6 wherein said carrier comprises the wall of a reactor defining said reaction zone.

8. The method of claim 3 wherein said carrier is in the form of a plurality of separate bodies.

References Cited

UNITED STATES PATENTS 2,524,865  10/1950  Winslow _____ 260—678
2,524,866  10/1950  Winslow _____ 250—678

DELBERT E. GANTZ, *Primary Examiner.*

J. D. MYERS, *Assistant Examiner.*